United States Patent
Baghel et al.

(10) Patent No.: US 10,389,502 B2
(45) Date of Patent: Aug. 20, 2019

(54) DEMODULATION REFERENCE SIGNAL SEQUENCE SELECTION IN DEVICE-TO-DEVICE COMMUNICATION

(71) Applicant: QUALCOMM Incorporated, San Diego, CA (US)

(72) Inventors: Sudhir Kumar Baghel, Hillsborough, NJ (US); Shailesh Patil, Raritan, NJ (US); Kapil Gulati, Dover, DE (US); Zhibin Wu, Bedminster, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/676,762

(22) Filed: Aug. 14, 2017

(65) Prior Publication Data
US 2018/0062809 A1    Mar. 1, 2018

Related U.S. Application Data

(60) Provisional application No. 62/379,218, filed on Aug. 24, 2016.

(51) Int. Cl.
*H04L 5/00*    (2006.01)
*H04W 72/04*    (2009.01)
(Continued)

(52) U.S. Cl.
CPC ......... *H04L 5/0048* (2013.01); *H04L 1/0061* (2013.01); *H04L 1/0072* (2013.01);
(Continued)

(58) Field of Classification Search
CPC ......... H04L 5/00; H04L 5/0048; H04W 72/04
See application file for complete search history.

(56) References Cited

U.S. PATENT DOCUMENTS

2018/0006864 A1* 1/2018 Hwang ............... H04L 27/2613
2018/0054693 A1* 2/2018 Agiwal ................ H04W 76/14
(Continued)

OTHER PUBLICATIONS

Intel Corporation: "Clarification on CRC Value for Initialization of PSSCH Sidelink Scrambling and DMRS Sequence Generation (Correction to V2V CR-36.212)", 3GPP Draft: R1-1609455, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 1, 2016, XP051159526, Retrieved from the Internet: URL:http://www.3gpp.org/ftp/tsg_ran/WG1_RL1/TSGR1_86b/Docs/ [retrieved on Oct. 1, 2016], 2 pages.

(Continued)

*Primary Examiner* — Jinsong Hu
*Assistant Examiner* — Farideh Madani
(74) *Attorney, Agent, or Firm* — Holland & Hart LLP; Clint R. Morin

(57) ABSTRACT

A transmitting UE may in a device-to-device (D2D) communication may identify a demodulation reference signal (DMRS) sequence for a D2D transmission based at least in part on a subset of bits of a sidelink control information (SCI) transmission. The subset of bits of the SCI transmission may be selected such that the bits have sufficient variability to reduce the likelihood that multiple UEs may use the same DMRS sequence. The subset of bits of the SCI transmission may be all or a portion of a cyclic redundancy check (CRC) for the SCI.

30 Claims, 12 Drawing Sheets

(51) Int. Cl.
  *H04L 1/00* (2006.01)
  *H04W 92/18* (2009.01)
(52) U.S. Cl.
  CPC ....... *H04L 5/0091* (2013.01); *H04W 72/0406* (2013.01); *H04W 92/18* (2013.01)

(56) References Cited

U.S. PATENT DOCUMENTS

2018/0146494 A1* 5/2018 Khoryaev ............. H04W 76/14
2018/0279351 A1* 9/2018 Shimezawa ....... H04W 72/1289

OTHER PUBLICATIONS

International Search Report and Written Opinion—PCT/US2017/046988—ISA/EPO—dated Nov. 22, 2017.
LG Electronics: "Corrections on Randomizing PSSCH DM-RS", 3GPP Draft; R1-1609179, 3rd Generation Partnership Project (3GPP), Mobile Competence Centre, 650, Route Des Lucioles, F-06921 Sophia-Antipolis Cedex, France, vol. RAN WG1, No. Lisbon, Portugal; Oct. 9, 2016, XP051149225, Retrieved from the Internet: URL:http://www.3gpp.org/ftp/Meetings_3GPP_SYNC/RAN1/Docs/ [retrieved on Oct. 9, 2016], 4 pages.
LG Electronics et al., "WF on PSSCH DMRS", 3GPP Draft; R1-168117, 3rd Generation Partnership Project (3GPP), Mobile Competence Centre, 650, Route Des Lucioles, F-06921 Sophia-Antipolis Cedex, France, vol. RAN WG1, No. vol. RAN WG1, No. Gothenburg, Sweden; Aug. 23, 2016, XP051143823, Retrieved from the Internet: URL:http://www.3gpp.org/ftp/Meetings_3GPP_SYNC/RAN1/Docs/ [retrieved on Aug. 23, 2016], 2 pages.
LG Electronics: "Remaining Details on DMRS for PSCCH and PSSCH", 3GPP Draft; R1-166821, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 13, 2016, XP051132898, Retrieved from the Internet: URL:http://www.3gpp.org/ftp/tsg_ran/WG1_RL1/TSGR1_86/Docs/ [retrieved on Aug. 13, 2016], 3 pages.
LG Electronics: "Remaining Issues on SCI Contents", 3GPP Draft; R1-166831, 3rd Generation Partnership Project (3GPP), Mobile Competence Centre, 650, Route Des Lucioles, F-06921 Sophia-Antipolis Cedex, France, vol. RAN WG1, No. Gothenburg, Sweden; Aug. 21, 2016, XP051140405, Retrieved from the Internet: URL:http://www.3gpp.org/ftp/Meetings_3GPP_SYNC/RAN1/Docs/ [retrieved on Aug. 21, 2016], 3 pages.

* cited by examiner

DEMODULATION REFERENCE SIGNAL SEQUENCE SELECTION IN DEVICE-TO-DEVICE COMMUNICATION

CROSS REFERENCES

The present Application for Patent claims priority to U.S. Provisional Patent Application No. 62/379,218 by BAGHEL et al., entitled "Demodulation Reference Signal (DMRS) Sequence Selection In Device-To-Device Communication," filed Aug. 24, 2016, assigned to the assignee hereof.

BACKGROUND

The following relates generally to wireless communication, and more specifically to demodulation reference signal (DMRS) sequence selection in device-to-device (D2D) communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is designed to improve spectral efficiency, lower costs, improve services, make use of new spectrum, and better integrate with other open standards. LTE may use OFDMA on the downlink (DL), single-carrier frequency division multiple access (SC-FDMA) on the uplink (UL), and multiple-input multiple-output (MIMO) antenna technology. A wireless multiple-access communications system (including an LTE system) may include a number of base stations, each supporting communication for multiple communication devices, which may be otherwise known as user equipment (UE).

Some wireless systems may support D2D communication, which may enable UEs to communicate directly with each other without an intermediate connection to a central node, such as a base station. In some cases, the UEs may send control and data transmissions to each other. These transmissions may be transmitted using a demodulation reference signal (DMRS) sequence, which may be used by a receiver to assist in demodulation of the transmissions.

SUMMARY

A user equipment (UE) may communicate with one or more other UEs using device-to-device (D2D) communications techniques. A transmitting UE may identify a demodulation reference signal (DMRS) sequence for a D2D transmission based at least in part on a subset of bits of a sidelink control information (SCI) transmission. The subset of bits of the SCI transmission may be selected such that the bits have sufficient variability to reduce the likelihood that multiple UEs may use the same DMRS sequence. In some examples, the subset of bits of the SCI transmission may be all or a portion of a cyclic redundancy check (CRC) for the SCI. In some examples, the subset of bits of the SCI transmission may be eight bits of the CRC, and may be the least significant bits (LSB) or the most significant bits (MSB) of the CRC.

A method of wireless communication is described. The method may include identifying sidelink control information (SCI) associated with a sidelink transmission to be transmitted to one or more receivers, the SCI comprising a set of bits, identifying a demodulation reference signal (DMRS) sequence for use in transmitting the sidelink transmission based at least in part on a subset of the set of bits, transmitting the SCI to the one or more receivers, and transmitting the sidelink transmission based at least in part on the identified DMRS sequence.

An apparatus for wireless communication is described. The apparatus may include means for identifying sidelink control information (SCI) associated with a sidelink transmission to be transmitted to one or more receivers, the SCI comprising a set of bits, means for identifying a demodulation reference signal (DMRS) sequence for use in transmitting the sidelink transmission based at least in part on a subset of the set of bits, means for transmitting the SCI to the one or more receivers, and means for transmitting the sidelink transmission based at least in part on the identified DMRS sequence.

Another apparatus for wireless communication is described. The apparatus may include a processor, memory in electronic communication with the processor, and instructions stored in the memory. The instructions may be operable to cause the processor to identify sidelink control information (SCI) associated with a sidelink transmission to be transmitted to one or more receivers, the SCI comprising a set of bits, identify a demodulation reference signal (DMRS) sequence for use in transmitting the sidelink transmission based at least in part on a subset of the set of bits, transmit the SCI to the one or more receivers, and transmit the sidelink transmission based at least in part on the identified DMRS sequence.

A non-transitory computer readable medium for wireless communication is described. The non-transitory computer-readable medium may include instructions operable to cause a processor to identify sidelink control information (SCI) associated with a sidelink transmission to be transmitted to one or more receivers, the SCI comprising a set of bits, identify a demodulation reference signal (DMRS) sequence for use in transmitting the sidelink transmission based at least in part on a subset of the set of bits, transmit the SCI to the one or more receivers, and transmit the sidelink transmission based at least in part on the identified DMRS sequence.

Some examples of the method, apparatus, and non-transitory computer-readable medium described above may further include processes, features, means, or instructions for computing a cyclic redundancy check (CRC) for one or more information fields within the SCI, and where the identifying the DMRS sequence may be based at least in part on the CRC. In some examples of the method, apparatus, and non-transitory computer-readable medium described above, the subset of bits comprises at least a subset of bits of the CRC. In some examples of the method, apparatus, and non-transitory computer-readable medium described above, the subset of bits comprises a predetermined number of least significant bits of the CRC or a predetermined number of most significant bits of the CRC.

In some examples of the method, apparatus, and non-transitory computer-readable medium described above, the DMRS sequence may be identified based at least in part on a mapping between the subset of bits and the DMRS sequence. In some examples of the method, apparatus, and non-transitory computer-readable medium described above, the techniques may be performed by a transmitting user equipment (UE) and the one or more receivers comprise one or more receiving UEs operating in a device-to-device (D2D) configuration.

A method of wireless communication is described. The method may include receiving a sidelink control information (SCI) transmission from a transmitter, the SCI comprising a set of bits, identifying a demodulation reference signal (DMRS) sequence for use in demodulating a sidelink transmission associated with the SCI based at least in part on a subset of the set of bits, receiving the sidelink transmission, and demodulating the sidelink transmission based at least in part on the identified DMRS sequence.

An apparatus for wireless communication is described. The apparatus may include means for receiving a sidelink control information (SCI) transmission from a transmitter, the SCI comprising a set of bits, means for identifying a demodulation reference signal (DMRS) sequence for use in demodulating a sidelink transmission associated with the SCI based at least in part on a subset of the set of bits, means for receiving the sidelink transmission, and means for demodulating the sidelink transmission based at least in part on the identified DMRS sequence.

Another apparatus for wireless communication is described. The apparatus may include a processor, memory in electronic communication with the processor, and instructions stored in the memory. The instructions may be operable to cause the processor to receive a sidelink control information (SCI) transmission from a transmitter, the SCI comprising a set of bits, identify a demodulation reference signal (DMRS) sequence for use in demodulating a sidelink transmission associated with the SCI based at least in part on a subset of the set of bits, receive the sidelink transmission, and demodulate the sidelink transmission based at least in part on the identified DMRS sequence.

A non-transitory computer readable medium for wireless communication is described. The non-transitory computer-readable medium may include instructions operable to cause a processor to receive a sidelink control information (SCI) transmission from a transmitter, the SCI comprising a set of bits, identify a demodulation reference signal (DMRS) sequence for use in demodulating a sidelink transmission associated with the SCI based at least in part on a subset of the set of bits, receive the sidelink transmission, and demodulate the sidelink transmission based at least in part on the identified DMRS sequence.

In some examples of the method, apparatus, and non-transitory computer-readable medium described above, the DMRS sequence may be identified based at least in part on a plurality of cyclic redundancy check (CRC) bits within the SCI. In some examples of the method, apparatus, and non-transitory computer-readable medium described above, the plurality of CRC bits comprises at least a subset of bits of the CRC. In some examples of the method, apparatus, and non-transitory computer-readable medium described above, the subset of bits comprises a predetermined number of least significant bits of the CRC or a predetermined number of most significant bits of the CRC.

In some examples of the method, apparatus, and non-transitory computer-readable medium described above, the DMRS sequence may be identified based at least in part on a mapping between the subset of bits and the DMRS sequence.

In some examples of the method, apparatus, and non-transitory computer-readable medium described above, the techniques may be performed by a receiving user equipment (UE) and the transmitter comprises a transmitting UE operating in a device-to-device (D2D) configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
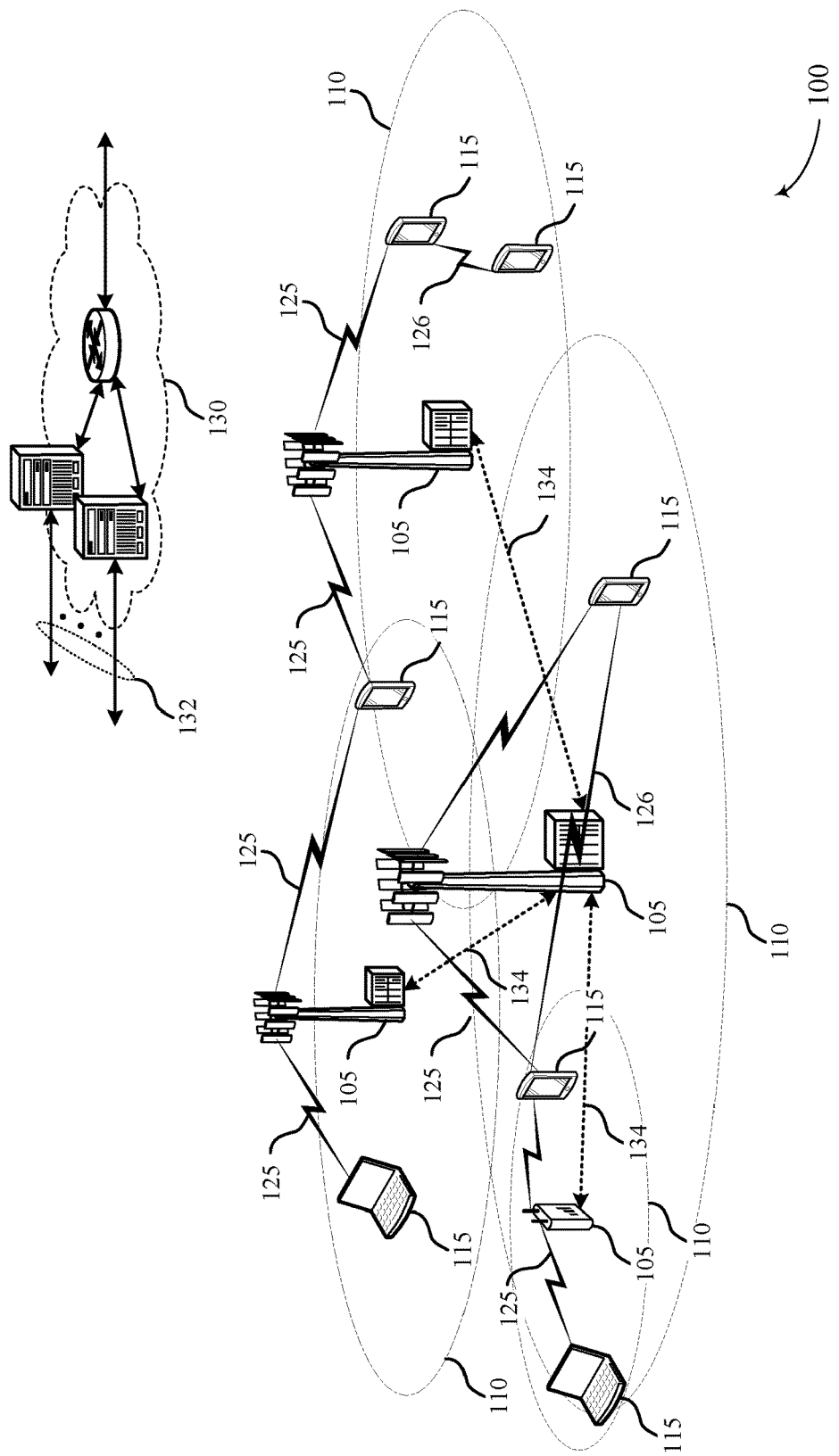
FIG. 1 illustrates an example of a system for wireless communication that supports demodulation reference signal (DMRS) sequence selection in device-to-device (D2D) communications in accordance with aspects of the present disclosure.

Some wireless systems may support device-to-device (D2D) communication among devices, which may enable user equipments (UEs) to communicate directly with each other without an intermediate connection to a central device, such as a base station. Systems may support low-latency D2D communications by, for example, employing a pattern known or recognized by devices within the system. In D2D, one UE may be known as a transmitting UE and another UE may be known as a receiving UE. In some cases, a D2D structure for communication among UEs may include control information signaled by a base station. For example, a transmitting UE may receive downlink control information (DCI) from a base station, and the DCI may include control information—including a pattern for data and reference signal transmissions—that supports D2D communication with a receiving UE. The transmitting UE may send sidelink control information (SCI) to a receiving UE configured by higher layers to monitor for this information. After configuration of data a transmission, a transmitting UE may transmit using a primary sidelink shared channel (PSSCH). Resource block allocation may come from the original DCI format grant and may be replicated in a SCI format grant from the transmitting UE. The receiving UE may configure PSSCH based on reception of SCI.

In some cases, D2D communications may be demodulation reference signal (DMRS)-based communications, in which a transmitting UE may use a particular DMRS sequence for a transmission, which may be indicated to the receiving UE and used by the receiving UE for demodulation of the transmission. In some deployments, DMRS sequence selection for data may be based on an eight-bit destination ID signaled in SCI. However, in some deployments, such as in V2X deployments where vehicles may transmit broadcast information to multiple D2D receivers (e.g., multiple other vehicles), there is no specific destination ID needed in SCI. In some aspects of this disclosure, DMRS sequences may be selected based on other bits in the SCI. Furthermore, it may be desirable that such DMRS sequence information be indicated without the use of dedicated bits, while also providing that the bits used to identify the DMRS sequence are sufficiently different to avoid multiple UEs from using the same sequence. In some examples, the CRC field in the SCI may be selected to indicate the DMRS sequence. The CRC field is dependent on bits in various SCI fields, and can provide sufficient uniqueness for a UE. In some examples, eight bits of CRC (either LSB or MSB) are used for indication of the selected DMRS sequence. In other examples, different fields of the SCI may be used to indicate the DMRS sequence.

Aspects of the disclosure discussed above are further described below in the context of a wireless communications system. Specific examples are then described for creating sidelinks among UEs for D2D communication, determining and indicating DMRS sequences, and decoding received transmissions based on the DMRS sequences. These and other aspects of the disclosure are further illustrated by and described with reference to apparatus diagrams, system diagrams, and flowcharts that relate to low latency D2D communication.

FIG. 1 illustrates an example of a wireless communications system 100 that supports DMRS sequence selection in D2D communications in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network. Wireless communications system 100 may support D2D communications between one or more UEs 115. For example, UEs 115 may transmit D2D messages using DMRS sequences according to techniques provided herein.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or downlink (DL) transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal, a handset, a user agent, a client, or some other suitable terminology. A UE 115 may also be a cellular phone, a wireless modem, a handheld device, a personal computer, a tablet, a personal electronic device, a machine type communication (MTC) device or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

Wireless communication links 126, which may be referred to as sidelinks, may also be established between UEs 115 in a D2D communications configuration. One or more of a group of UEs 115 utilizing D2D communications may be within the geographic coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independent of a base station 105.

A frame structure may be used to organize physical resources. A frame may be a 10 ms interval that may be further divided into 10 equally sized sub-frames. Each sub-frame may include two consecutive time slots. Each slot may include 6 or 7 orthogonal frequency division multiple access (OFDMA) symbol periods. A resource element consists of one symbol period and one subcarrier (a 15 KHz frequency range). A resource block may contain 12 consecutive subcarriers in the frequency domain and, for a normal cyclic prefix in each OFDM symbol, 7 consecutive OFDM symbols in the time domain (1 slot), or 84 resource elements. Some resource elements may include DL reference signals (DL-RS). The DL-RS may include a cell-specific reference signals (CRS) and a UE-specific RS (UE-RS), which may also be referred to as demodulation reference signals (DMRS). UE-RS may be transmitted on the resource blocks associated with PDSCH. The number of bits carried by each resource element may depend on the modulation scheme (the configuration of symbols that may be selected during each symbol period). Thus, the more resource blocks that a UE receives and the higher the modulation scheme, the higher the data rate may be. In some cases, various DMRS sequences in a transmission for D2D communication may exist, and a UE may signal which DMRS sequence is used for a transmission, which a receiving UE may use for receiving and demodulating the associated transmission.

A DMRS (also referred to as UE-RS) may be transmitted only on resource blocks associated with a particular DMRS sequence, and may include signals on six resource elements in each resource block in which they are transmitted. The DMRS for different antenna ports may each utilize the same six resource elements, and may be distinguished using different orthogonal cover codes (e.g., masking each signal with a different combination of 1 or −1 in different resource elements). In some cases, two sets of DMRS may be transmitted in adjoining resource elements. In some cases, as indicated above, DMRS sequences may be selected based on certain bits in the SCI that may be mapped to different DMRS sequences. The SCI bits used to identify the DMRS sequence for a transmission may be selected to avoid multiple UEs from using the same sequence. In some examples, the CRC field in the SCI may be selected to indicate the DMRS sequence. The CRC field is dependent on bits in various SCI fields, and can provide sufficient uniqueness for a UE. In some examples, eight bits of CRC (either LSB or MSB) are used for indication of a selected DMRS sequence. In other examples, different fields of the SCI may be used to indicate the DMRS sequence.

Figure 2:
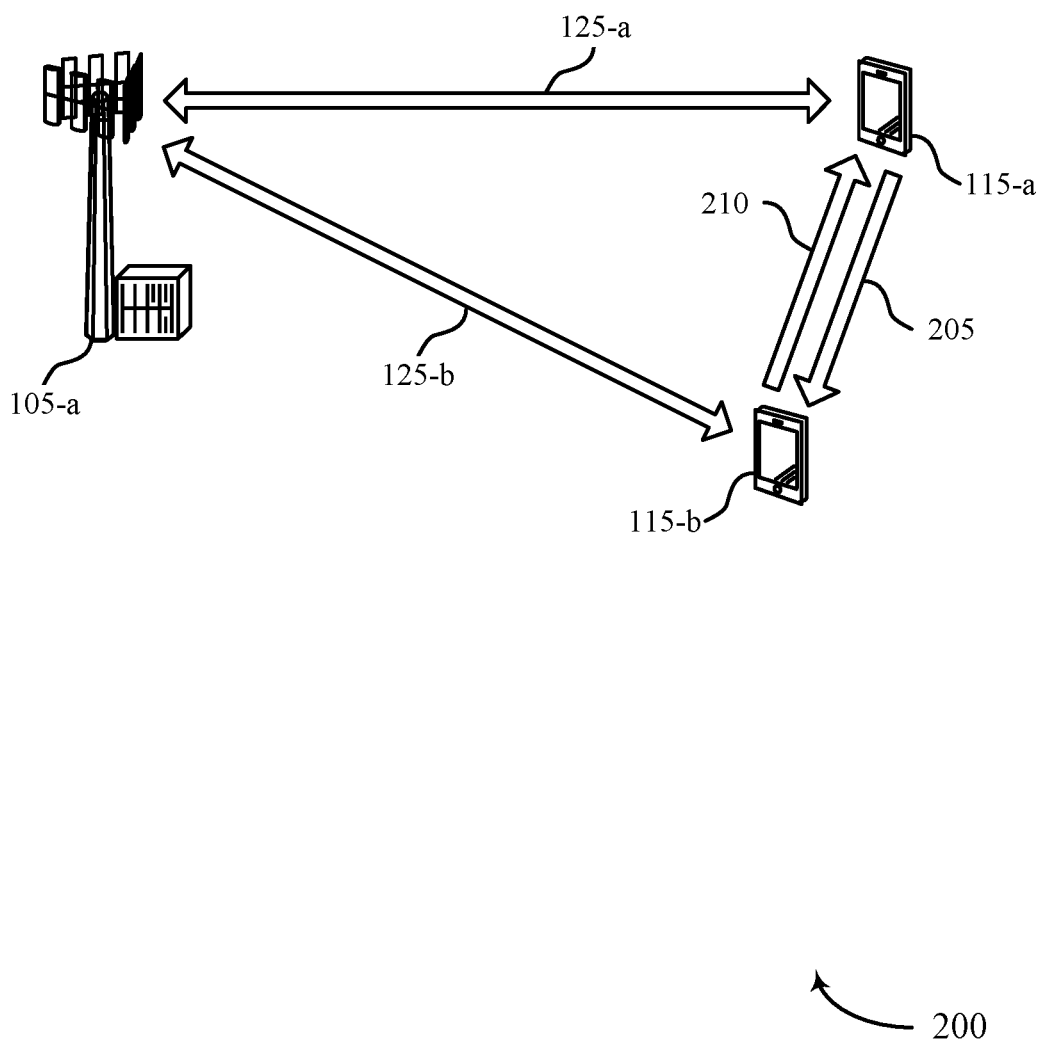
FIG. 2 illustrates an example of a wireless communications system that supports demodulation reference signal (DMRS) sequence selection in D2D communications in accordance with aspects of the present disclosure.

FIG. 2 illustrates an example of a wireless communications system 200 for DMRS sequence selection in D2D communication in accordance with various aspects of the present disclosure. Wireless communications system 200 may include a UE 115-a and base station 105-a, which may be examples of a UE 115 base station 105 described with reference to FIG. 1. Wireless communications system 200 may support D2D communication and peer-to-peer communication between UE 115-a and UE 115-b. UE 115-a may be referred to as a transmitting UE and UE 115-b may be referred to as a receiving UE. UE 115-a may be connected to base station 105-a by communication link 125-a. In some cases, UE 115-b may communicate with base station 105-a through communication link 125-b. UE 115-a may be configured to perform D2D communications with UE 115-b through sidelink 205. In some cases, UE 115-b may transmit to UE 115-a through sidelink 210.

Establishing a D2D connection may include a discovery process and a synchronization process. By way of example, the discovery process includes configuration of user timing or periodicity of discovery periods, payload content and sizing, and structure of subframe-based Tx/Rx resource pools. In some examples, UE 115-a may receive DCI and may transmit a physical sidelink control channel (PSCCH) transmission to UE 115-b. Resources for PSCCH may be configured using information communicated from base station 105-a and conveyed between UEs 115 with higher layer signaling. The PSCCH payload may be sent based on computed RB control assignments. The PSCCH may contain sidelink control information (SCI) format payload contents which may not include a destination ID specifying intended receiving UEs, but may include, for example, frequency resource allocation, hopping enabled flag, time allocation bitmask, master control system (MCS) and timing advance (e.g., UE 115-a sets may be based on its uplink timing), and cyclic redundancy check (CRC) information. In some cases, the above information may be copied from a DCI format grant. As indicated above, in some deployments a DMRS sequence may be based on a destination ID that is included in the SCI. In some examples of the present disclosure, other bits in the SCI may be used to indicate a DMRS sequence for a D2D transmission.

In some examples, the CRC field in the SCI may be selected to indicate the DMRS sequence. The CRC field is dependent on bits in various SCI fields, and can provide sufficient uniqueness for a UE. In some examples, eight bits of CRC (either LSB or MSB) are used for indication of selected DMRS sequence. In other examples, different fields of the SCI may be used to indicate the DMRS sequence. In some examples that use CRC to indicate a DMRS sequence, the transmitting UE 115-a may select the DMRS sequence for a transmission based on the CRC values of the SCI. In other examples, a portion of a CRC field may be used to indicate a selected DMRS sequence, with the CRC adjusted to provide CRC information for the SCI in remaining portions of the CRC field. For example, if a CRC field is 24 bits, eight bits (e.g., eight LSBs or MSBs) may be used to indicate the DMRS sequence, with the remaining 16 bits used for CRC. In other examples, the full 24 bits may be used for CRC, a portion of the CRC bits may be mapped to DMRS sequences, and the DMRS sequence for a transmission determined based on the mapping.

Figure 3A:
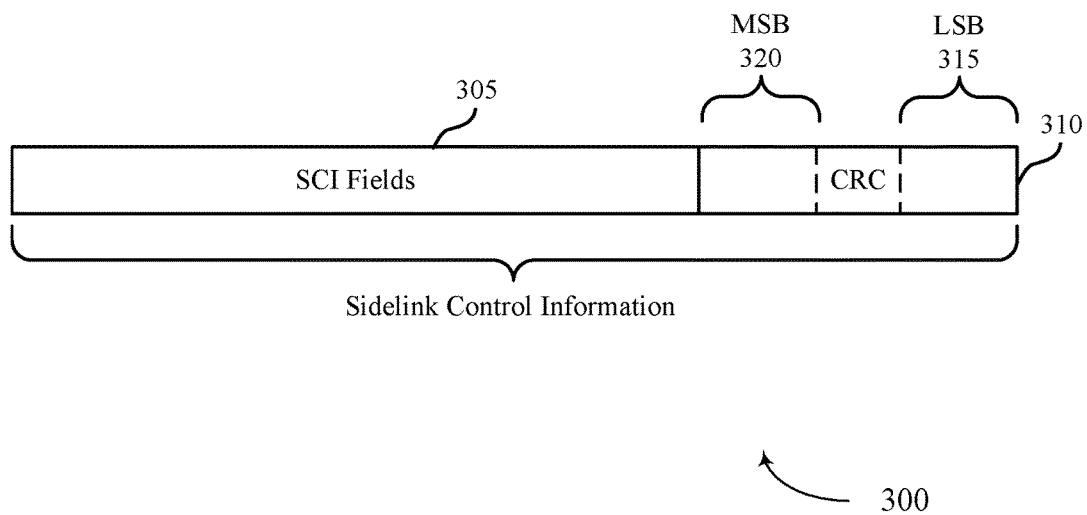
FIG. 3A illustrates an example of sidelink control information (SCI) that supports demodulation reference signal (DMRS) sequence selection in D2D communications in accordance with aspects of the present disclosure.

FIG. 3A illustrates an example of sidelink control information (SCI) 300 that supports DMRS sequence selection in D2D communications in accordance with aspects of the present disclosure. The SCI 300 may be transmitted between UEs 115 discussed in FIGS. 1 and 2. The SCI 300 may include SCI fields 305, which may include fields for, for example, frequency resource allocation, hopping enabled flag, time allocation bitmask, master control system (MCS) and timing advance. The SCI may also include CRC 310. In some examples, a value of the CRC 310 may be used to identify a DMRS sequence of an associated sidelink transmission. For example, LSBs 315 of the CRC 310, or MSBs 320 of the CRC 310 may be used to indicate a DMRS sequence for the associated sidelink transmission.

Figure 3B:
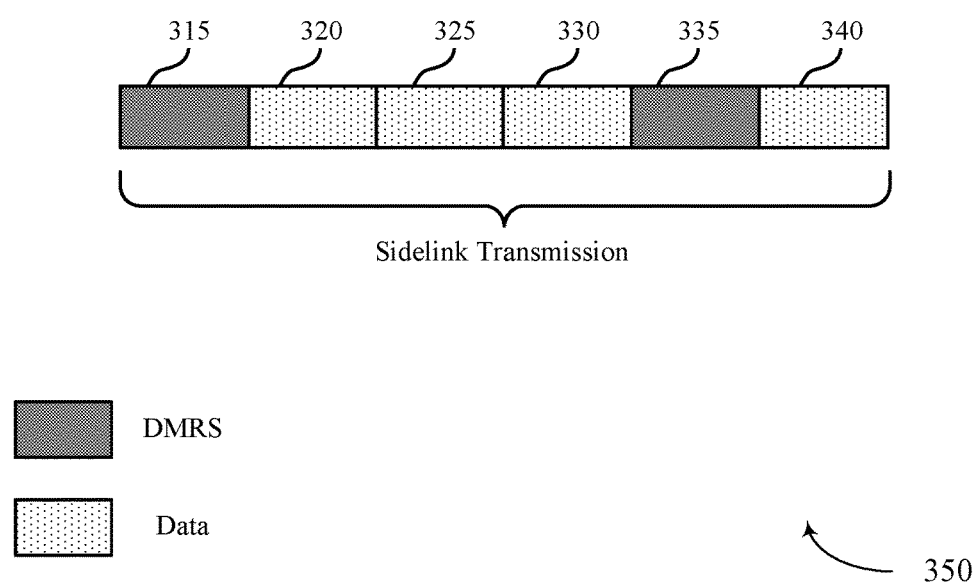
FIG. 3B illustrates an example of a DMRS and data sequence in D2D communications in accordance with aspects of the present disclosure.

FIG. 3B illustrates an example of a sidelink transmission 350 in D2D communication in accordance with aspects of the present disclosure. The sidelink transmission 350 may be transmitted between UEs 115 discussed in FIGS. 1 and 2. The sidelink transmission 350 may include DMRS symbols 315 and 335, and data symbols 320, 325, 330, and 340. The DMRS sequence for the sidelink transmission 350 may be identified, as discussed above, based on the CRC of the sidelink control information 300 of FIG. 3A.

Figure 4:
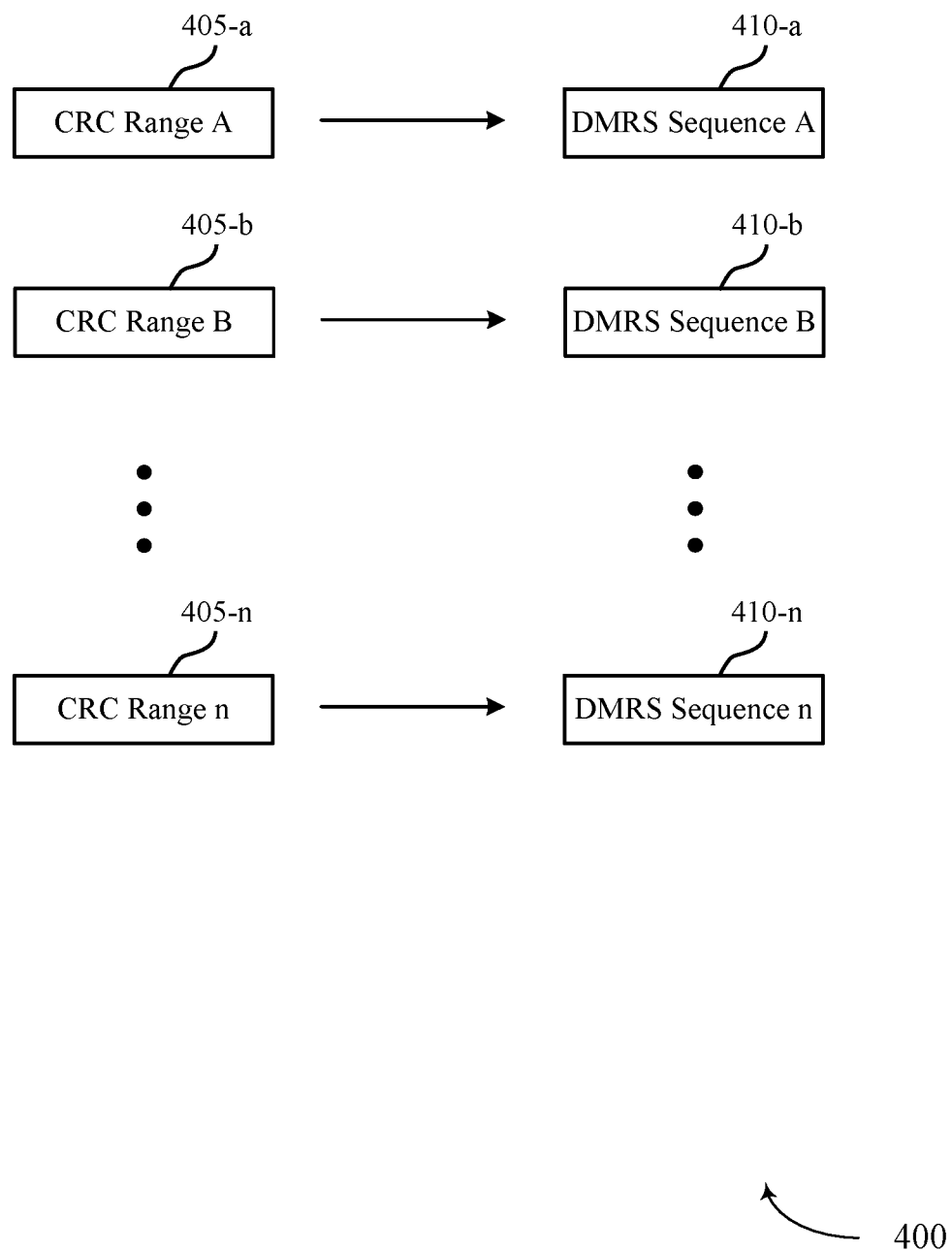
FIG. 4 illustrates an example of a mapping between cyclic redundancy check information and DMRS sequences in accordance with aspects of the present disclosure.

FIG. 4 illustrates an example of a mapping between cyclic redundancy check information and DMRS sequences in accordance with aspects of the present disclosure. The mapping 400 may be used for DMRS sequence identification for sidelink transmissions between UEs 115 discussed in FIGS. 1 and 2. In this example, different CRC values 405 may be mapped to different DMRS sequences 410. The CRC values 405 may correspond to ranges of CRC values, where a particular DMRS sequence 410 may be associated with the range of CRC values. In some examples, the ranges of CRC values 405 may be divided equally based on a number of bits of the CRC used for indicating the DMRS values. In other examples, the ranges of CRC values 405 may be divided to provide approximately an equal likelihood of CRC values for SCI information, so as to provide an approximately equal likelihood that each DMRS sequence 410 is selected for a transmission.

Figure 5:
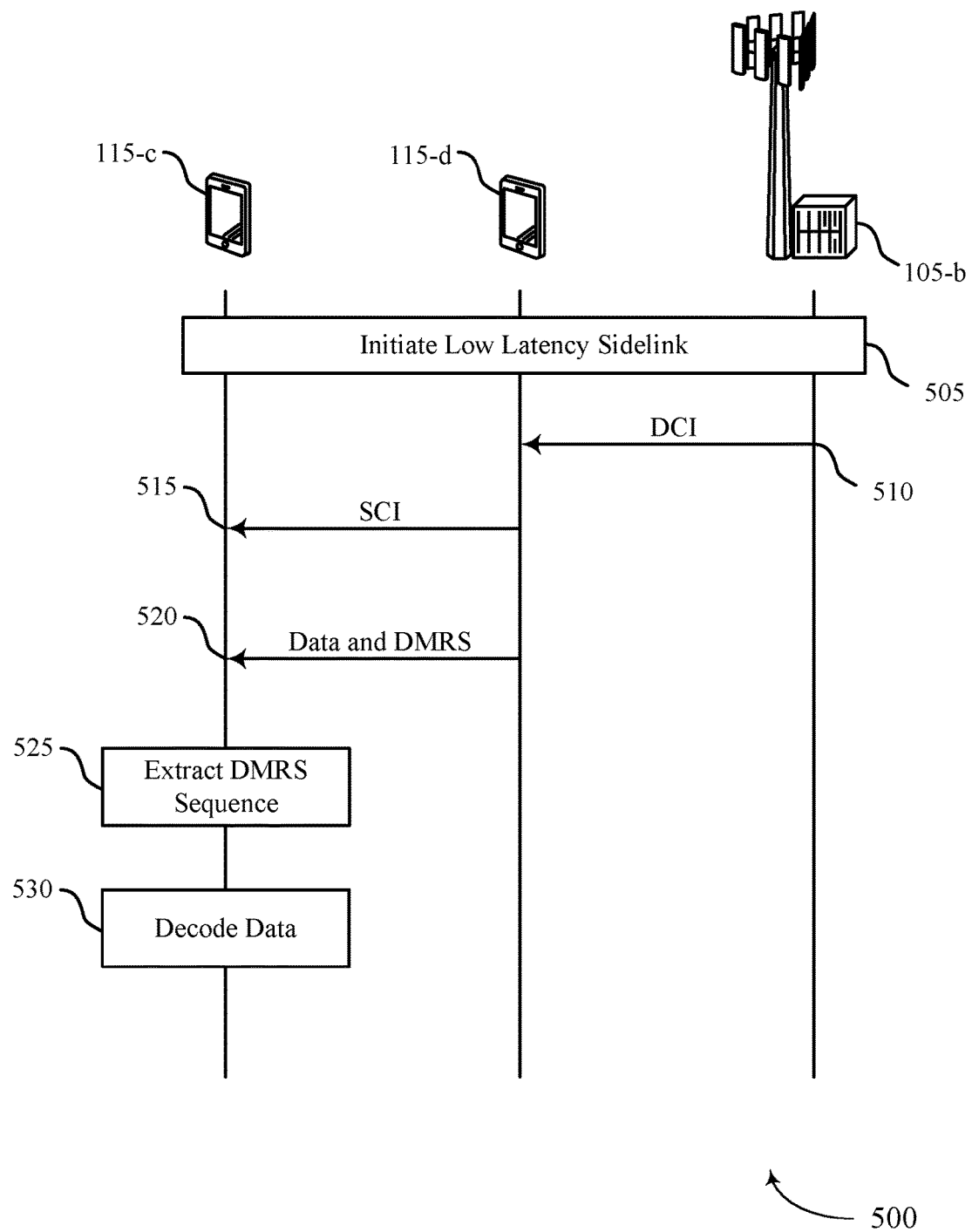
FIG. 5 illustrates an example of a process flow that supports demodulation reference signal (DMRS) sequence selection in D2D communications in accordance with aspects of the present disclosure.

FIG. 5 illustrates an example of a process flow 500 for DMRS sequence selection in D2D communication. Process flow 500 may include a UE 115-c, a UE 115-d, and base station 105-b, which may be examples of a UE 115 and base station 105 described with reference to FIGS. 1-2. UE 115-d may be known as a transmitting UE and UE 115-c may be known as a receiving UE. UE 115-c and 115-d may communicate directly over a sidelink configured for low latency operation. UE 115-d may receive DCI from base station 105-b and may then send SCI to UE 115-c based on the received DCI. UE 115-d may then transmit data and DMRS to UE 115-c.

At 505, UE 115-c, UE 115-d, and base station 105-b may initiate a low latency sidelink. Base station 105-b may transmit a sidelink initiation signal to UE 115-c and to UE 115-d. In some examples, the sidelink initiation signal may indicate that the sidelink communications are broadcast communications transmitted from transmitting UE 115-d to multiple receiving UEs 115-c. In such cases, the UEs 115 may be configured to determine a DMRS sequence for a sidelink transmission based on one or more bits of SCI determined by the transmitting UE 115-d. In some examples, a CRC of the SCI may be used to indicate a DMRS sequence for the associated sidelink transmission.

At 510, base station 105-b may send DCI to UE 115-d. At 515, transmitting UE 115-d may send SCI to UE 115-c. UE 115-d may identify the DMRS sequence for the sidelink transmission based on, for example, CRC information of the SCI. UE 115-d may transmit a sidelink control message including the CRC. At 520, transmitting UE 115-d may send data and DMRS symbols to UE 115-c, which may be transmitted using the identified DMRS sequence. At 525, UE 115-c may extract the DMRS sequence based on the CRC of the SCI sent by UE 115-d. At 530, UE 115-c may decode the data of the SCI transmission based at least in part on the identified DMRS sequence.

Figure 6:
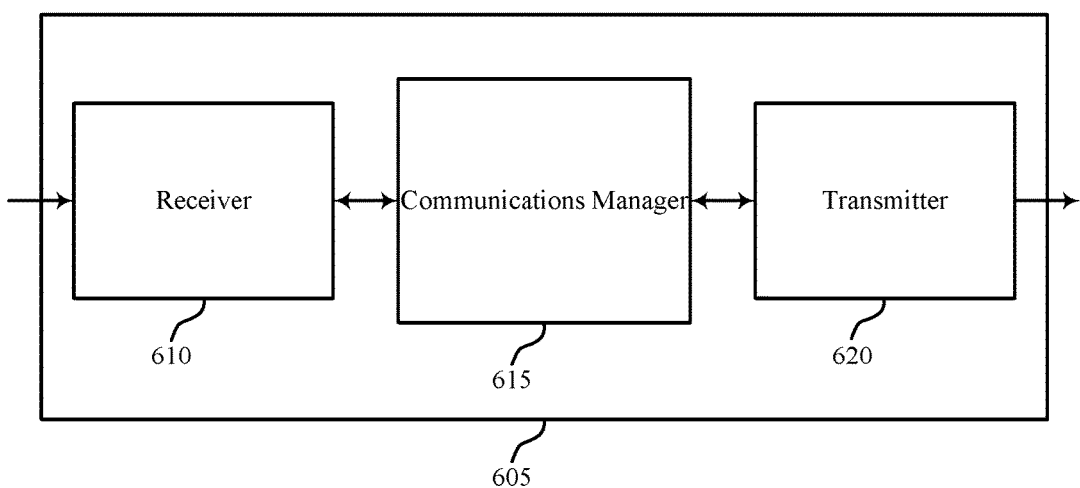
FIGS. 6 through 8 show block diagrams of a device that supports demodulation reference signal (DMRS) sequence selection in D2D communications in accordance with aspects of the present disclosure.

FIG. 6 shows a block diagram 600 of a wireless device 605 that supports demodulation reference signal (DMRS) sequence selection in D2D communication in accordance with various aspects of the present disclosure. Wireless device 605 may be an example of aspects of a user equipment (UE) 115 as described with reference to FIG. 1. Wireless device 605 may include receiver 610, communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to demodulation reference signal (DMRS) sequence selection in D2D communication, etc.). Information may be passed on to other components of the device. The receiver 610 may be an example of aspects of the transceiver 935 described with reference to FIG. 9.

Communications manager 615 may be an example of aspects of the communications manager 915 described with reference to FIG. 9.

Communications manager 615, when the wireless device 605 is a transmitting D2D UE, may identify sidelink control information (SCI) associated with a sidelink transmission to be transmitted to one or more receivers, identify a demodulation reference signal (DMRS) sequence for use in transmitting the sidelink transmission based on a subset of the set of bits of the SCI, transmit the SCI to the one or more receivers, and transmit the sidelink transmission based on the identified DMRS sequence. The communications manager 615 may also, when the wireless device 605 is a receiving D2D UE, receive a sidelink control information (SCI) transmission from a transmitter, identify a demodulation reference signal (DMRS) sequence for use in demodulating a sidelink transmission associated with the SCI based on a subset of the set of SCI bits, receive the sidelink transmission, and demodulate the sidelink transmission based on the identified DMRS sequence.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may include a single antenna, or it may include a set of antennas.

Figure 7:
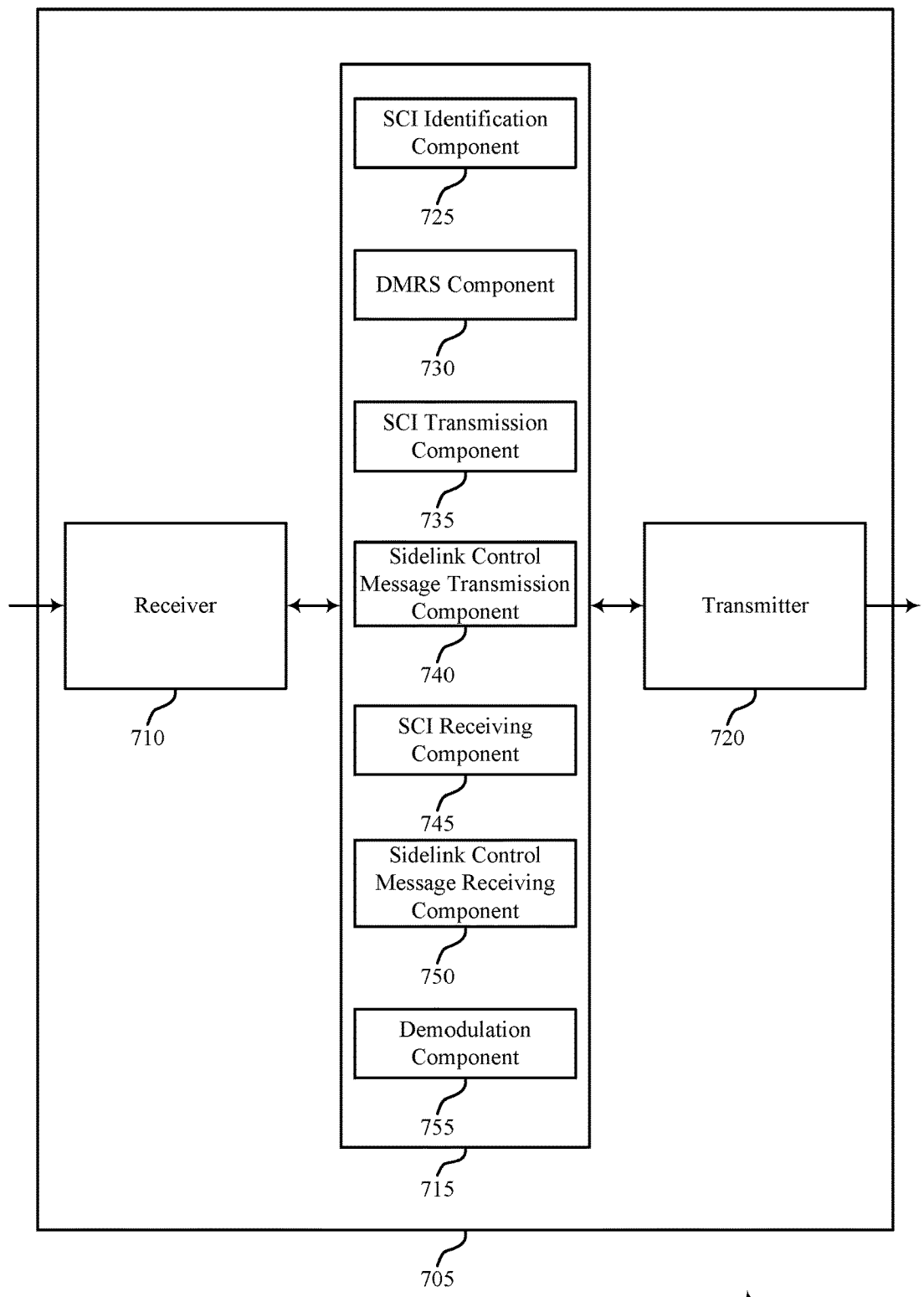

FIG. 7 shows a block diagram 700 of a wireless device 705 that supports demodulation reference signal (DMRS) sequence selection in D2D communication in accordance with various aspects of the present disclosure. Wireless device 705 may be an example of aspects of a wireless device 605 or a UE 115 as described with reference to FIGS. 1 and 6. Wireless device 705 may include receiver 710, communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to demodulation reference signal (DMRS) sequence selection in D2D communication, etc.). Information may be passed on to other components of the device. The receiver 710 may be an example of aspects of the transceiver 935 described with reference to FIG. 9.

Communications manager 715 may be an example of aspects of the communications manager 915 described with reference to FIG. 9.

Communications manager 715 may also include SCI identification component 725, DMRS component 730, SCI transmission component 735, sidelink communication transmission component 740, SCI receiving component 745, sidelink transmission receiving component 750, and demodulation component 755.

SCI identification component 725 may identify sidelink control information (SCI) associated with a sidelink transmission to be transmitted to one or more receivers, the SCI including a set of bits. In some cases, the method is performed by a transmitting UE and the one or more receivers include one or more receiving UEs operating in a D2D configuration.

DMRS component 730 may identify a demodulation reference signal (DMRS) sequence for use in transmitting the sidelink transmission based on a subset of the set of bits. DMRS component 730 may also identify a demodulation reference signal (DMRS) sequence for use in demodulating a sidelink transmission associated with the SCI based on a subset of the set of bits. In some cases, the identifying the DMRS sequence is based on the cyclic redundancy check (CRC). In some cases, the subset of bits includes at least a subset of bits of the CRC. In some cases, the subset of bits includes a predetermined number of least significant bits of the CRC or a predetermined number of most significant bits of the CRC. In some cases, the DMRS sequence is identified based on a mapping between the subset of bits and the DMRS sequence.

SCI transmission component 735 may transmit the SCI to the one or more receivers. Sidelink control message transmission component 740 may transmit the sidelink transmission based on the identified DMRS sequence.

SCI receiving component 745 may receive a sidelink control information (SCI) transmission from a transmitter, the SCI including a set of bits. In some cases, the method is performed by a receiving UE and transmitter includes a transmitting UE operating in a D2D configuration. Sidelink control message receiving component 750 may receive the sidelink transmission, and demodulation component 755 may demodulate the sidelink transmission based on the identified DMRS sequence.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may include a single antenna, or it may include a set of antennas.

Figure 8:
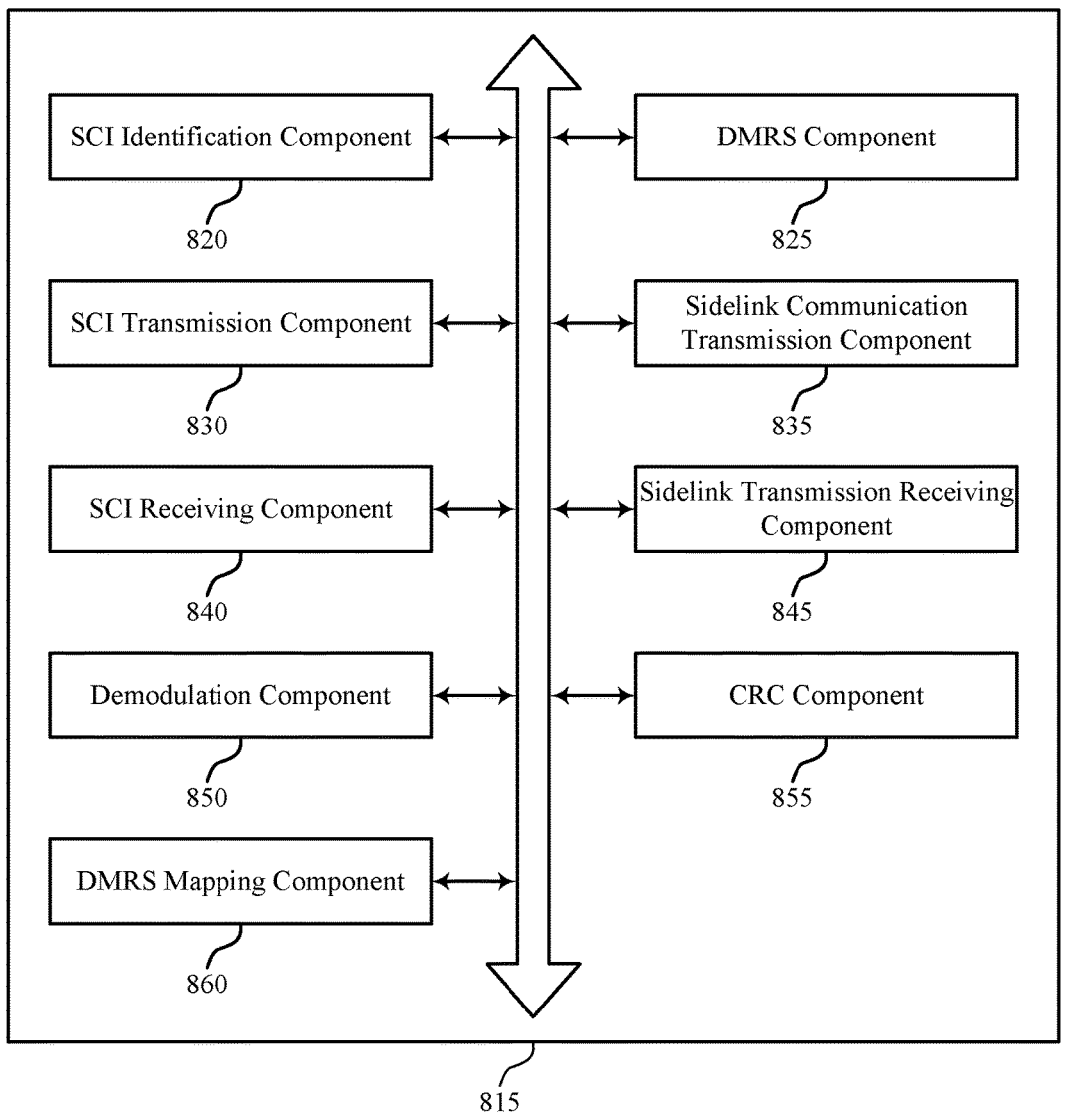

FIG. 8 shows a block diagram 800 of a communications manager 815 that supports demodulation reference signal (DMRS) sequence selection in D2D communication in accordance with various aspects of the present disclosure. The communications manager 815 may be an example of aspects of a communications manager 615, a communications manager 715, or a communications manager 915 described with reference to FIGS. 6, 7, and 9. The communications manager 815 may include SCI identification component 820, DMRS component 825, SCI transmission component 830, sidelink communication transmission component 835, SCI receiving component 840, sidelink transmission receiving component 845, demodulation component 850, CRC component 855, and DMRS mapping component 860. Each of these modules may communicate, directly or indirectly, with one another (e.g., via one or more buses).

SCI identification component 820 may identify sidelink control information (SCI) associated with a sidelink transmission to be transmitted to one or more receivers, the SCI including a set of bits. In some cases, the method is performed by a transmitting UE and the one or more receivers include one or more receiving UEs operating in a D2D configuration. DMRS component 825 may identify a demodulation reference signal (DMRS) sequence for use in transmitting the sidelink transmission based on a subset of the set of bits. DMRS component 825 may also, when receiving sidelink transmissions, identify a demodulation reference signal (DMRS) sequence for use in demodulating a sidelink transmission associated with the SCI based on a subset of the set of bits. In some cases, the identifying the DMRS sequence is based on the CRC. In some cases, the subset of bits includes at least a subset of bits of the CRC. In some cases, the subset of bits includes a predetermined number of least significant bits of the CRC or a predetermined number of most significant bits of the CRC. In some cases, the DMRS sequence is identified based on a mapping between the subset of bits and the DMRS sequence.

SCI transmission component 830 may transmit the SCI to the one or more receivers. Sidelink control message transmission component 835 may transmit the sidelink transmission based on the identified DMRS sequence. SCI receiving component 840 may receive a sidelink control information (SCI) transmission from a transmitter, the SCI including a set of bits. In some cases, the method is performed by a receiving UE and transmitter includes a transmitting UE operating in a D2D configuration. Sidelink control message receiving component 845 may receive the SCI information. Demodulation component 850 may demodulate the sidelink transmission based on the identified DMRS sequence. CRC component 855 may compute a CRC for one or more information fields within the SCI. DMRS mapping component 860 may provide a mapping between the subset of bits and the DMRS sequence.

Figure 9:
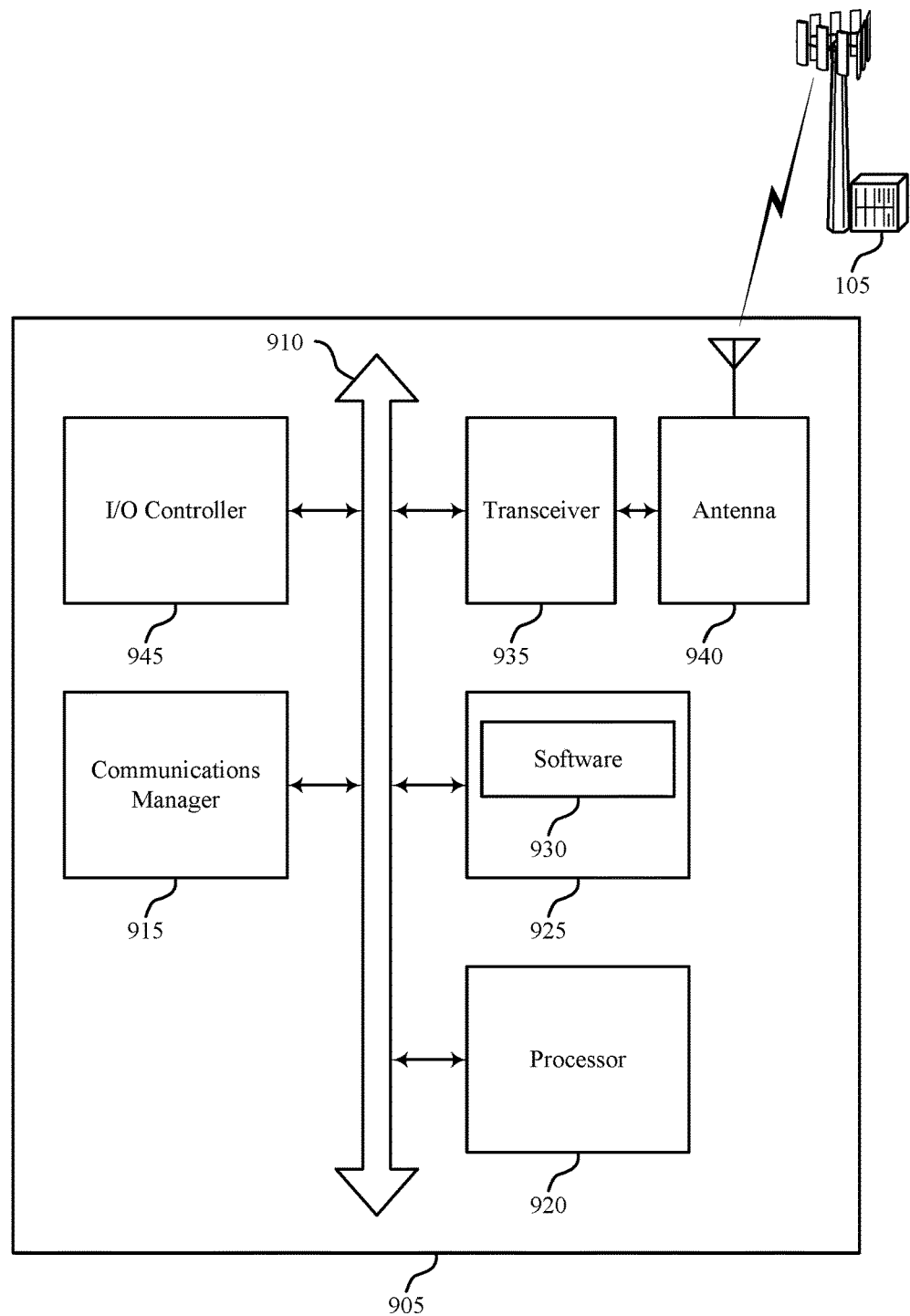
FIG. 9 illustrates a block diagram of a system including a UE that supports demodulation reference signal (DMRS) sequence selection in D2D communications in accordance with aspects of the present disclosure.

FIG. 9 shows a diagram of a system 900 including a device 905 that supports demodulation reference signal (DMRS) sequence selection in D2D communication in accordance with various aspects of the present disclosure. Device 905 may be an example of or include the components of wireless device 605, wireless device 705, or a UE 115 as described above, e.g., with reference to FIGS. 1, 6 and 7. Device 905 may include components for bi-directional voice and data communications including components for transmitting and receiving communications, including communications manager 915, processor 920, memory 925, software 930, transceiver 935, antenna 940, and I/O controller 945. These components may be in electronic communication via one or more busses (e.g., bus 910). Device 905 may communicate wirelessly with one or more base stations 105.

Processor 920 may include an intelligent hardware device, (e.g., a general-purpose processor, a digital signal processor (DSP), a central processing unit (CPU), a microcontroller, an application-specific integrated circuit (ASIC), an field-programmable gate array (FPGA), a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting demodulation reference signal (DMRS) sequence selection in D2D communication).920.

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware and/or software operation such as the interaction with peripheral components or devices.

Software 930 may include code to implement aspects of the present disclosure, including code to support demodulation reference signal (DMRS) sequence selection in D2D communication. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system.

Figure 10:
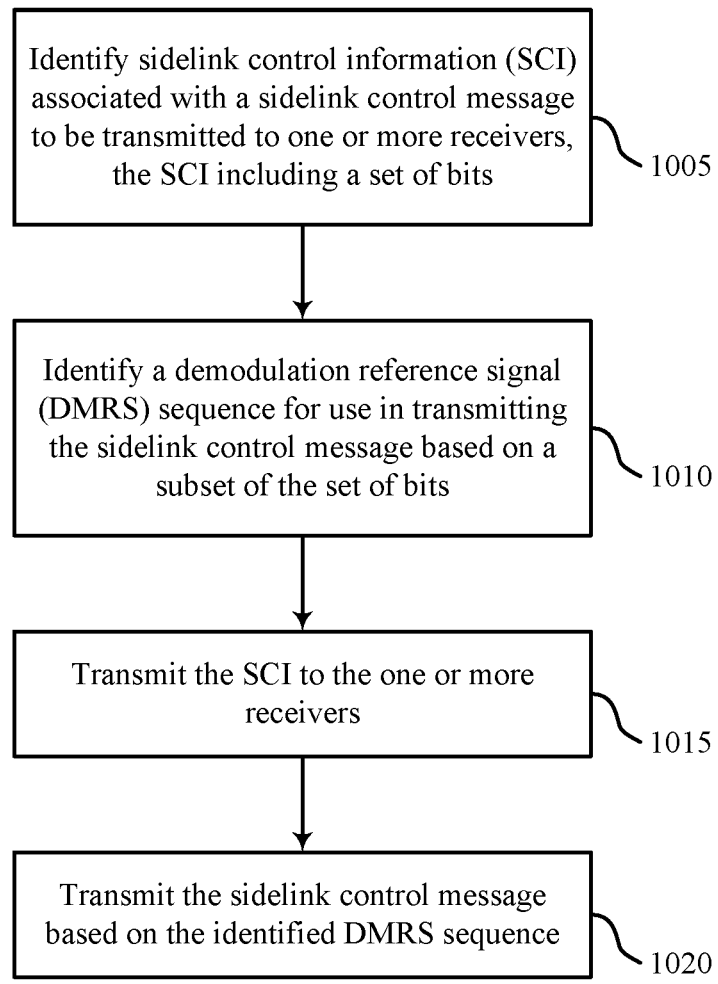
FIGS. 10 through 12 illustrate methods for demodulation reference signal (DMRS) sequence selection in D2D communications in accordance with aspects of the present disclosure.

FIG. 10 shows a flowchart illustrating a method 1000 for demodulation reference signal (DMRS) sequence selection in D2D communication in accordance with various aspects of the present disclosure. The operations of method 1000 may be implemented by a UE 115 or its components as described herein. For example, the operations of method 1000 may be performed by a communications manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1005 the UE 115 may identify sidelink control information (SCI) associated with a sidelink transmission to be transmitted to one or more receivers, the SCI comprising a set of bits. The operations of block 1005 may be performed according to the methods described with reference to FIGS. 1 through 5. In certain examples, aspects of the operations of block 1005 may be performed by a SCI identification component as described with reference to FIGS. 6 through 9.

At block 1010 the UE 115 may identify a demodulation reference signal (DMRS) sequence for use in transmitting the sidelink transmission based at least in part on a subset of the set of bits. The operations of block 1010 may be performed according to the methods described with reference to FIGS. 1 through 5. In certain examples, aspects of the operations of block 1010 may be performed by a DMRS component as described with reference to FIGS. 6 through 9.

At block 1015 the UE 115 may transmit the SCI to the one or more receivers. The operations of block 1015 may be performed according to the methods described with reference to FIGS. 1 through 5. In certain examples, aspects of the operations of block 1015 may be performed by a SCI transmission component as described with reference to FIGS. 6 through 9.

At block 1020 the UE 115 may transmit the sidelink transmission based at least in part on the identified DMRS sequence. The operations of block 1020 may be performed according to the methods described with reference to FIGS. 1 through 5. In certain examples, aspects of the operations of block 1020 may be performed by a sidelink communication transmission component as described with reference to FIGS. 6 through 9.

Figure 11:
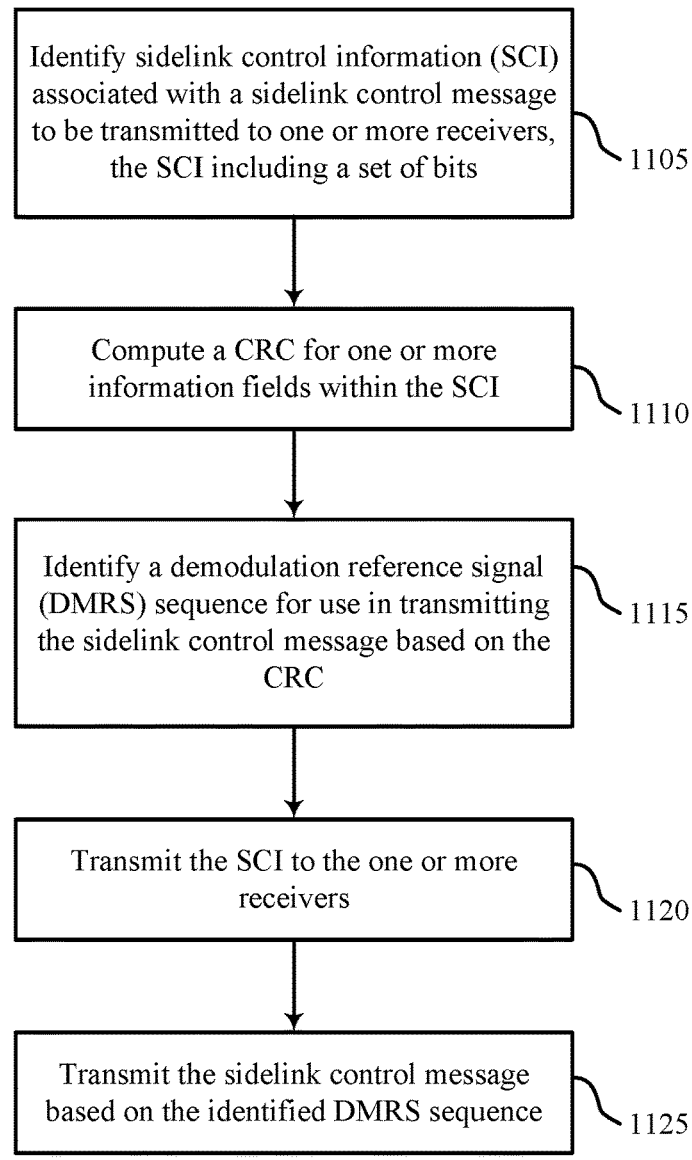

FIG. 11 shows a flowchart illustrating a method 1100 for demodulation reference signal (DMRS) sequence selection in D2D communication in accordance with various aspects of the present disclosure. The operations of method 1100 may be implemented by a UE 115 or its components as described herein. For example, the operations of method 1100 may be performed by a communications manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1105 the UE 115 may identify sidelink control information (SCI) associated with a sidelink transmission to be transmitted to one or more receivers, the SCI comprising a set of bits. The operations of block 1105 may be performed according to the methods described with reference to FIGS. 1 through 5. In certain examples, aspects of the operations of block 1105 may be performed by a SCI identification component as described with reference to FIGS. 6 through 9.

At block 1110 the UE 115 may compute a cyclic redundancy check (CRC) for one or more information fields within the SCI. The operations of block 1110 may be performed according to the methods described with reference to FIGS. 1 through 5. In certain examples, aspects of the operations of block 1110 may be performed by a CRC component as described with reference to FIGS. 6 through 9. In some cases, the identifying the DMRS sequence is based at least in part on the CRC.

At block 1115 the UE 115 may identify a demodulation reference signal (DMRS) sequence for use in transmitting the sidelink control message based on the CRC. The operations of block 1115 may be performed according to the methods described with reference to FIGS. 1 through 5. In certain examples, aspects of the operations of block 1115 may be performed by a DMRS component as described with reference to FIGS. 6 through 9.

At block 1120 the UE 115 may transmit the SCI to the one or more receivers. The operations of block 1120 may be performed according to the methods described with reference to FIGS. 1 through 5. In certain examples, aspects of the operations of block 1120 may be performed by a SCI transmission component as described with reference to FIGS. 6 through 9.

At block 1125 the UE 115 may transmit the sidelink transmission based at least in part on the identified DMRS sequence. The operations of block 1125 may be performed according to the methods described with reference to FIGS. 1 through 5. In certain examples, aspects of the operations of block 1125 may be performed by a sidelink communication transmission component as described with reference to FIGS. 6 through 9.

Figure 12:
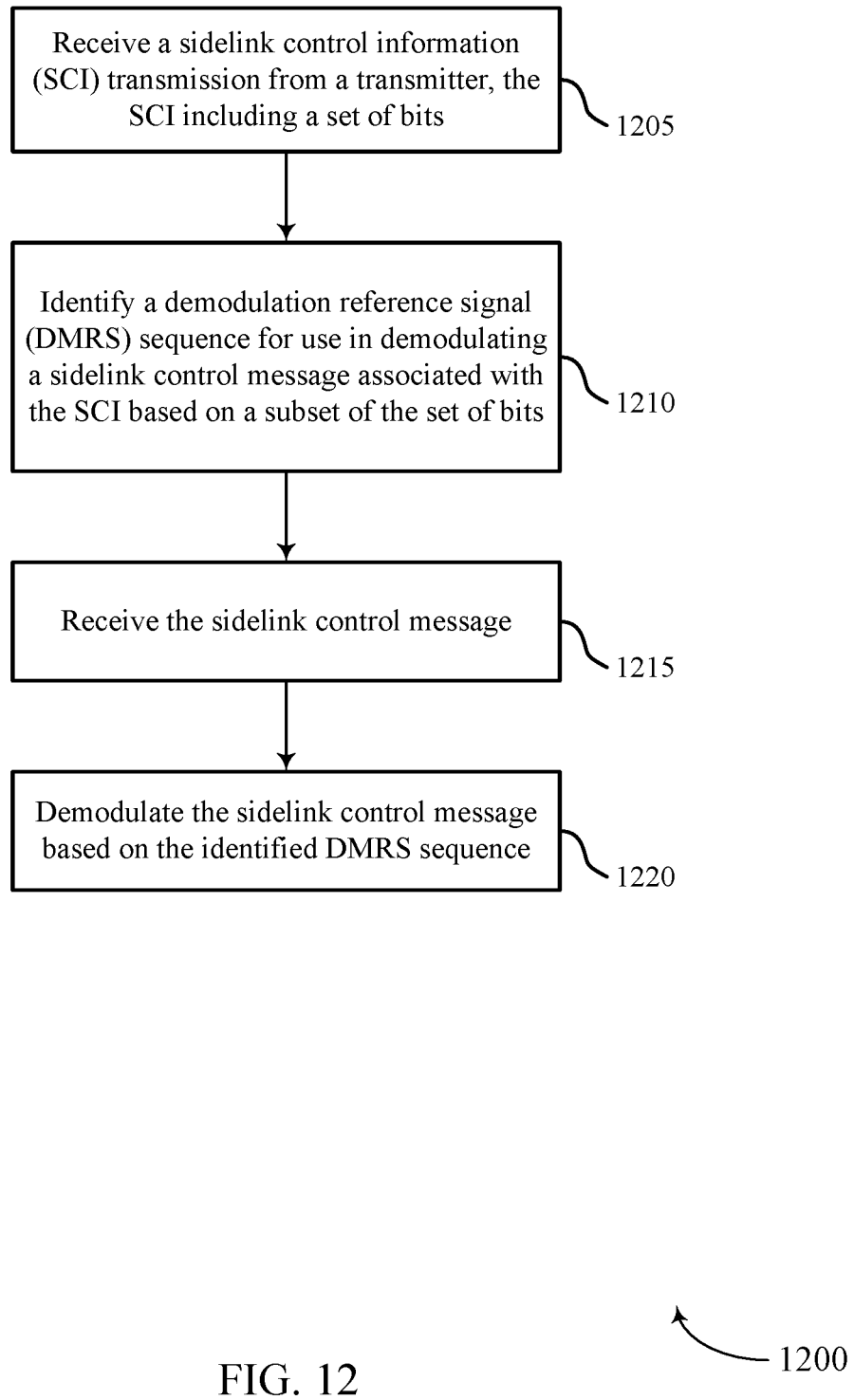

FIG. 12 shows a flowchart illustrating a method 1200 for demodulation reference signal (DMRS) sequence selection in D2D communication in accordance with various aspects of the present disclosure. The operations of method 1200 may be implemented by a UE 115 or its components as described herein. For example, the operations of method 1200 may be performed by a communications manager as described with reference to FIGS. 6 through 9. In some examples, a UE 115 may execute a set of codes to control the functional elements of the device to perform the functions described below. Additionally or alternatively, the UE 115 may perform aspects the functions described below using special-purpose hardware.

At block 1205 the UE 115 may receive a sidelink control information (SCI) transmission from a transmitter, the SCI comprising a set of bits. The operations of block 1205 may be performed according to the methods described with reference to FIGS. 1 through 5. In certain examples, aspects of the operations of block 1205 may be performed by a SCI receiving component as described with reference to FIGS. 6 through 9.

At block 1210 the UE 115 may identify a demodulation reference signal (DMRS) sequence for use in demodulating a sidelink transmission associated with the SCI based at least in part on a subset of the set of bits. The operations of block 1210 may be performed according to the methods described with reference to FIGS. 1 through 5. In certain examples, aspects of the operations of block 1210 may be performed by a DMRS component as described with reference to FIGS. 6 through 9.

At block 1215 the UE 115 may receive the sidelink transmission. The operations of block 1215 may be performed according to the methods described with reference to FIGS. 1 through 5. In certain examples, aspects of the operations of block 1215 may be performed by a sidelink transmission receiving component as described with reference to FIGS. 6 through 9.

At block 1220 the UE 115 may demodulate the sidelink transmission based at least in part on the identified DMRS sequence. The operations of block 1220 may be performed according to the methods described with reference to FIGS. 1 through 5. In certain examples, aspects of the operations of block 1220 may be performed by a demodulation component as described with reference to FIGS. 6 through 9.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A time division multiple access (TDMA) system may implement a radio technology such as Global System for Mobile Communications (GSM).

An orthogonal frequency division multiple access (OFDMA) system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications system (UMTS). 3GPP Long Term Evolution (LTE) and LTE-Advanced (LTE-A) are releases of Universal Mobile Telecommunications System (UMTS) that use E-UTRA. UTRA, E-UTRA, UMTS, LTE, LTE-A, and Global System for Mobile communications (GSM) are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects an LTE system may be described for purposes of example, and LTE terminology may be used in much of the description, the techniques described herein are applicable beyond LTE applications.

In LTE/LTE-A networks, including such networks described herein, the term evolved node B (eNB) may be generally used to describe the base stations. The wireless communications system or systems described herein may include a heterogeneous LTE/LTE-A network in which different types of evolved node B (eNBs) provide coverage for various geographical regions. For example, each eNB or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
identifying sidelink control information (SCI) associated with a sidelink data transmission to be transmitted to one or more receivers, the SCI comprising a set of bits;
computing a cyclic redundancy check (CRC) for one or more fields within the SCI;
identifying a demodulation reference signal (DMRS) sequence for use in transmitting the sidelink data transmission based at least in part on a subset of bits and the computed CRC;
transmitting the SCI and the computed CRC to the one or more receivers; and
transmitting the sidelink data transmission based at least in part on the identified DMRS sequence.

2. The method of claim 1, wherein the subset of bits comprises at least a subset of bits of the CRC.

3. The method of claim 2, wherein the subset of bits comprises a predetermined number of least significant bits of the CRC or a predetermined number of most significant bits of the CRC.

4. The method of claim 1, wherein the DMRS sequence is identified based at least in part on a mapping between the subset of bits and the DMRS sequence.

5. The method of claim 4, wherein the mapping comprises:
determining a value of the subset of bits; and
determining the value of the subset of bits falls within a value range associated with the DMRS sequence.

6. The method of claim 1, wherein the method is performed by a transmitting user equipment (UE) and the one or more receivers comprise one or more receiving UEs operating in a device-to-device configuration.

7. The method of claim 1, wherein the subset of bits comprises a CRC field.

8. The method of claim 1, wherein the one or more fields within the SCI and the subset of bits comprise a CRC field.

9. A method for wireless communication, comprising:
receiving a sidelink control information (SCI) transmission and a plurality of cyclic redundancy check (CRC) bits from a transmitter, the SCI comprising a set of bits;
identifying a demodulation reference signal (DMRS) sequence for use in demodulating a sidelink data transmission associated with the SCI based at least in part on a subset of bits and the plurality of cyclic redundancy check (CRC) bits within the SCI;
receiving the sidelink data transmission; and
demodulating the sidelink data transmission based at least in part on the identified DMRS sequence.

10. The method of claim 9, wherein the plurality of CRC bits comprises at least a subset of bits of the CRC.

11. The method of claim 10, wherein the subset of bits comprises a predetermined number of least significant bits of the CRC or a predetermined number of most significant bits of the CRC.

12. The method of claim 9, wherein the DMRS sequence is identified based at least in part on a mapping between the subset of bits and the DMRS sequence.

13. The method of claim 12, wherein the mapping comprises:
determining a value of the subset of bits; and
determining the value of the subset of bits falls within a value range associated with the DMRS sequence.

14. The method of claim 9, wherein the method is performed by a receiving user equipment (UE) and transmitter comprises a transmitting UE operating in a device-to-device configuration.

15. The method of claim 9, wherein the subset of bits comprises a CRC field.

16. An apparatus for wireless communication, in a system comprising:
a processor;
memory in electronic communication with the processor; and
instructions stored in the memory and operable, when executed by the processor, to cause the apparatus to:
identify sidelink control information (SCI) associated with a sidelink data transmission to be transmitted to one or more receivers, the SCI comprising a set of bits;
compute a cyclic redundancy check (CRC) for one or more fields within the SCI;
identify a demodulation reference signal (DMRS) sequence for use in transmitting the sidelink data transmission based at least in part on a subset of bits and the computed CRC;
transmit the SCI and the computed CRC to the one or more receivers; and
transmit the sidelink data transmission based at least in part on the identified DMRS sequence.

17. The apparatus of claim 16, wherein the subset of bits comprises at least a subset of bits of the CRC.

18. The apparatus of claim 17, wherein the subset of bits comprises a predetermined number of least significant bits of the CRC or a predetermined number of most significant bits of the CRC.

19. The apparatus of claim 16, wherein the DMRS sequence is identified based at least in part on a mapping between the subset of bits and the DMRS sequence.

20. The apparatus of claim 19, wherein the instructions are further operable to cause the apparatus to:
determine a value of the subset of bits; and
determine the value of the subset of bits falls within a value range associated with the DMRS sequence.

21. The apparatus of claim 16, wherein the apparatus comprises a transmitting user equipment (UE) and the one or more receivers comprise one or more receiving UEs operating in a device-to-device configuration.

22. The apparatus of claim 16, wherein the subset of bits comprises a CRC field.

23. The apparatus of claim 16, wherein the one or more fields within the SCI and the subset of bits comprise a CRC field.

24. An apparatus for wireless communication, in a system comprising:
a processor;
memory in electronic communication with the processor; and
instructions stored in the memory and operable, when executed by the processor, to cause the apparatus to:
receive a sidelink control information (SCI) transmission and a plurality of cyclic redundancy check (CRC) bits from a transmitter, the SCI comprising a set of bits;
identify a demodulation reference signal (DMRS) sequence for use in demodulating a sidelink data transmission associated with the SCI based at least in part on a subset of bits and plurality of cyclic redundancy check (CRC) bits within the SCI;
receive the sidelink data transmission; and
demodulate the sidelink data transmission based at least in part on the identified DMRS sequence.

25. The apparatus of claim 24, wherein the plurality of CRC bits comprises at least a subset of bits of the CRC.

26. The apparatus of claim 25, wherein the subset of bits comprises a predetermined number of least significant bits of the CRC or a predetermined number of most significant bits of the CRC.

27. The apparatus of claim 24, wherein the DMRS sequence is identified based at least in part on a mapping between the subset of bits and the DMRS sequence.

28. The apparatus of claim 27, wherein the instructions are further operable to cause the apparatus to:
determine a value of the subset of bits; and
determine the value of the subset of bits falls within a value range associated with the DMRS sequence.

29. The apparatus of claim 24, wherein the apparatus comprises a receiving user equipment (UE) and the transmitter comprises a transmitting UE operating in a device-to-device configuration.

30. The apparatus of claim 24, wherein the subset of bits comprises a CRC field.

* * * * *